Nov. 2, 1965    J. H. McAULEY    3,215,256
FLEXIBLE CHAIN AND ITS SUPPORTING AND DRIVING MEANS
Filed March 4, 1964    4 Sheets-Sheet 2

INVENTOR.
JAMES H. McAULEY

BY
MAHONEY, MILLER & RAMBO
BY *Wm. V. Miller*
ATTORNEYS

Nov. 2, 1965    J. H. McAULEY    3,215,256
FLEXIBLE CHAIN AND ITS SUPPORTING AND DRIVING MEANS
Filed March 4, 1964    4 Sheets-Sheet 3
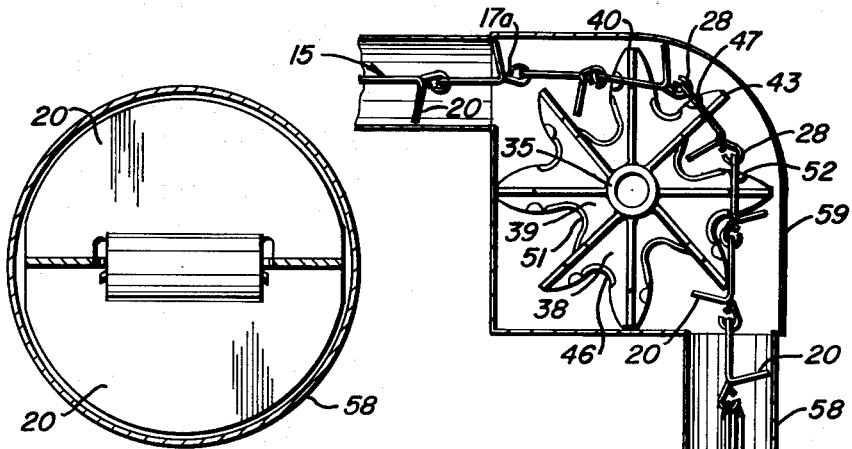
FIG. 5
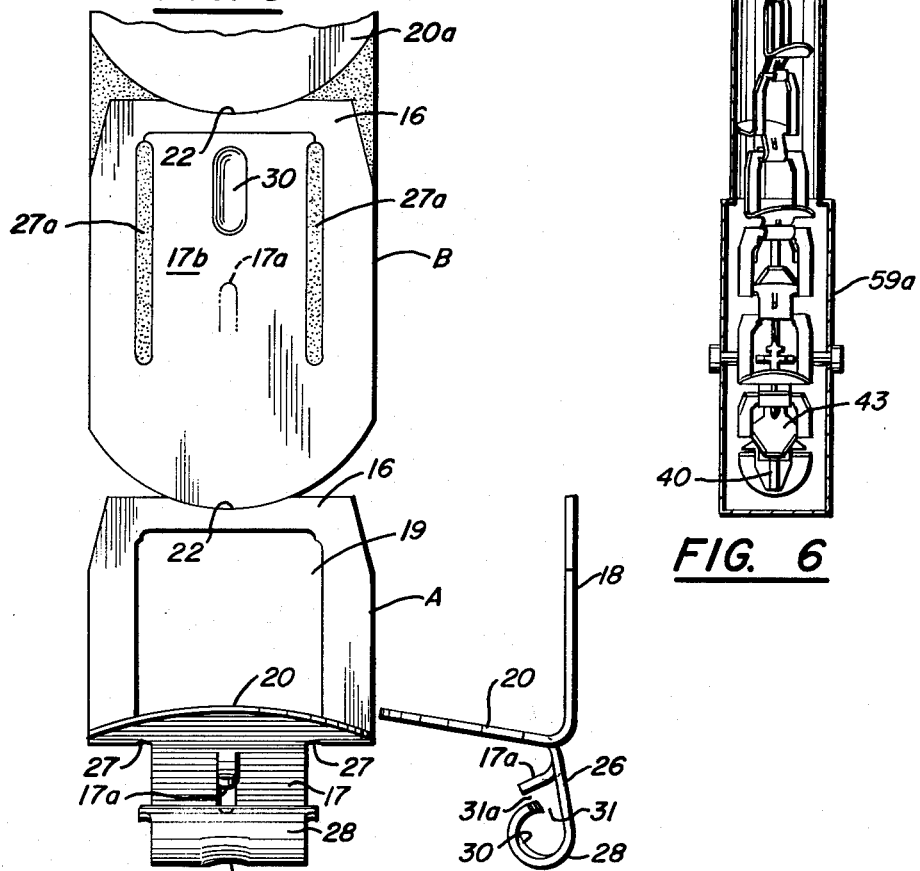
FIG. 6
FIG. 9    FIG. 10
INVENTOR.
JAMES H. McAULEY
BY
MAHONEY, MILLER & RAMBO
BY
ATTORNEYS Nov. 2, 1965  J. H. McAULEY  3,215,256
FLEXIBLE CHAIN AND ITS SUPPORTING AND DRIVING MEANS
Filed March 4, 1964  4 Sheets-Sheet 4

INVENTOR.
JAMES H. McAULEY
BY MAHONEY, MILLER & RAMBO
BY Wm. V. Miller
ATTORNEYS

United States Patent Office 3,215,256
Patented Nov. 2, 1965

1

3,215,256
FLEXIBLE CHAIN AND ITS SUPPORTING
AND DRIVING MEANS
James H. McAuley, Bremen, Ohio, assignor to McAuley
Manufacturing, Inc., Bremen, Ohio, a corporation of
Ohio
Filed Mar. 4, 1964, Ser. No. 349,281
13 Claims. (Cl. 198—168)

My invention relates to a Flexible Chain and Its Supporting and Driving Means. It has to do, more particularly, with a chain which is particularly suitable for moving loose, granular material, such as poultry or animal feed, along a feed conduit extending in both horizontal and vertical directions. The chain can also handle, in a conduit or trough, bulky feed or roughage material and can even handle aggregate, sand, etc. It also has to do with a sprocket construction for supporting and/or driving such a chain.

The chain made in accordance with this invention is composed of interlocking or interfitting links. The construction of the individual links is such that when hooked together, the resulting chain has the desired degree of flexibility. It is especially designed for traveling along an open trough having a semicircular bottom or through a closed conduit of circular cross-section. It is sufficiently flexible that it can travel between horizontal and vertical runs of conduit. It is of such a nature that in the closed conduit, it is provided with material-moving blades which will fill the cross-sectional area of the conduit. The chain can twist about its axis to permit it to go around angles in different planes and even though it twists in the conduit, the material-moving blades will still fill the cross-sectional area of the conduit to effectively move the material therealong regardless of whether the conduit is horizontal or vertical. The chain of this invention is formed of links which are simple, inexpensive, stampings that can be assembled with ease into any desired lengths. Also, although there is no danger of accidental disconnection of links during usage, the links can be disassembled with ease when it is desired to do so.

The sprockets which support the chain, either as driving sprockets or idlers, are of special construction to not only receive and support the chain, as well as to drive it effectively, but the chain and sprocket cooperate to keep the sprocket clean and free of the material being moved.

In the accompanying drawings I have illustrated a chain embodying my invention, a blank from which it can be stamped, a sprocket system for supporting and driving the chain in accordance with my invention, and an example of its use.

In these drawings:

FIGURE 5 is an enlarged transverse sectional view taken along line 5—5 of FIGURE 4.

FIGURE 6 is an enlarged, vertical sectional view taken along line 6—6 of FIGURE 4.

FIGURE 9 is a diagrammatic plan view illustrating a blank from which the chain links can be made.

2

FIGURE 10 is an edge view illustrating a link formed from the blank of FIGURE 9.

Figure 2:
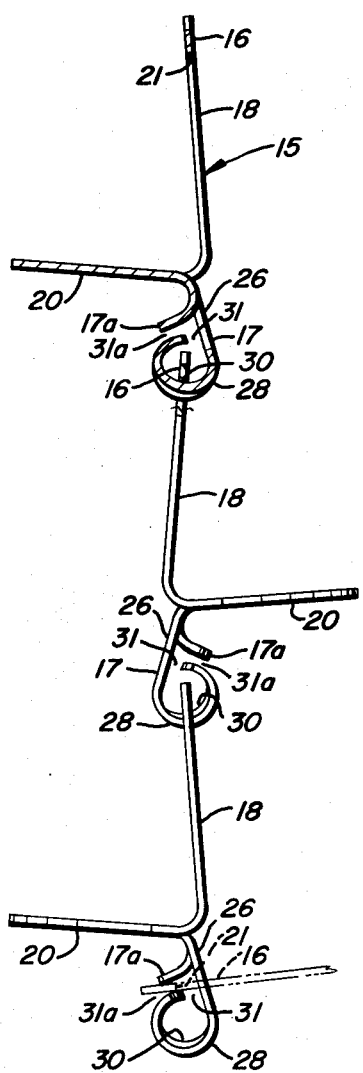
FIGURE 2 is a side elevation of the section of chain shown in FIGURE 1.
Figure 1:
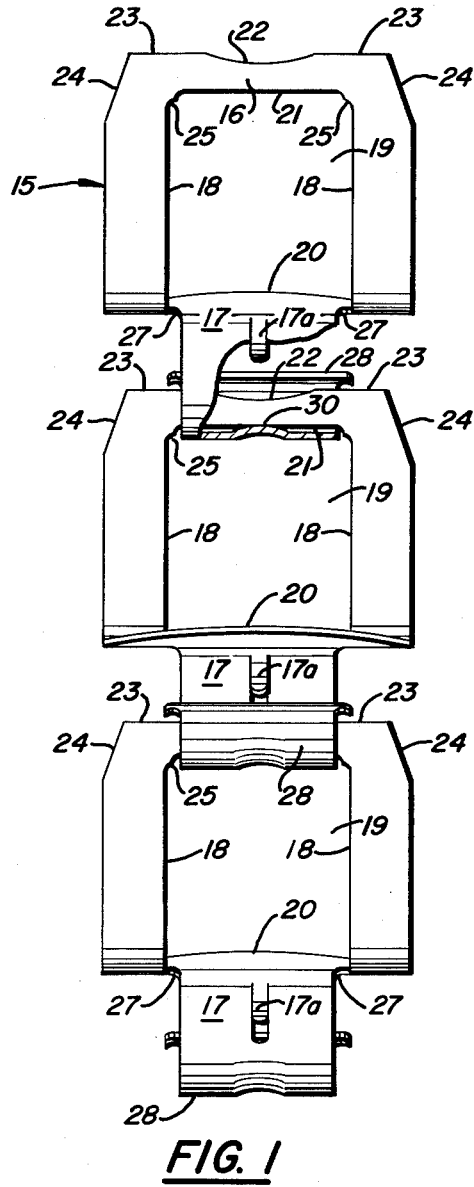
FIGURE 1 is a plan view, partly broken away, of interlocked links of a section of chain embodying my invention.
Figure 3:
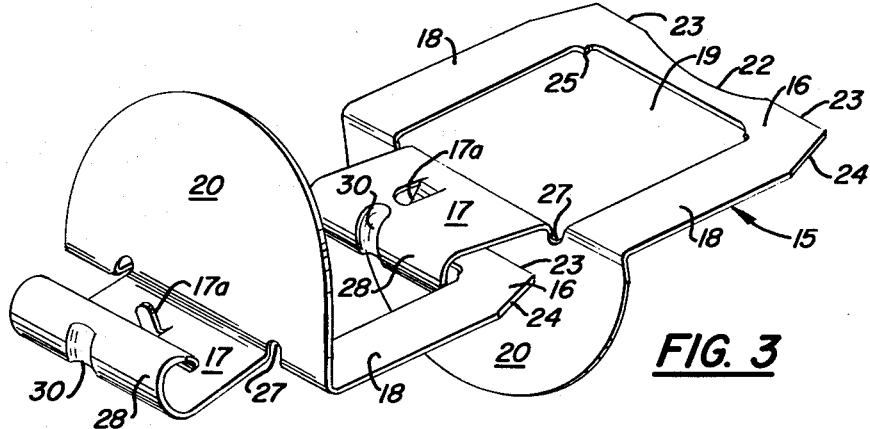
FIGURE 3 is a perspective view of two interlocked links of chain embodying the invention.

With reference to the drawings, I have illustrated in FIGURES 1, 2 and 3, a flexible chain composed of the interlocking links 15 which are so connected together that the links may pivot relative to each other at right angles to the plane of travel of the links, may swing relative to each other in the plane of the links, or may twist relative to each other about the longitudinal axis of the chain. An important feature of my present invention is that each link is provided with a push-blade 20 which will project from the plane of movement of the chain and extend transversely thereof so as to engage and push material through the conduit in which the chain operates. The push-blade is preferably semicircular, and the blade on successive links will project in opposite directions, so that the entire cross-sectional area of a circular conduit will be filled by the oppositely projecting push blades which will push the material along in a horizontal conduit and will push it or lift it vertically in a vertical conduit.

Each of the links 15 takes the form illustrated in the drawings and is produced by a stamping operation which will be discussed later. Each link consists of a flat pintle portion 16 at one end and a hook-shaped barrel portion 17 at the other end which are joined together by the two side portions 18. This arrangement provides a central aperture 19 which will receive a tooth of the driving or supporting sprockets which are provided for the chain.

The pintle portion 16 is at the forward end of the link relative to its travel, as indicated in FIGURE 1, and is provided with an inner or rear straight edge 21 and an outer or forward arcuate edge 22 which terminates at the forward blunt ends 23 of the connecting side portions 18. The outer edges of these side portions 18 are angled inwardly where they join the blunt ends 23 as indicated at 24. These portions are also angled at their inner rear corners as indicated at 25. These portions 16 and 18 lie in a common substantially flat plane and may be termed the body of the link.

At the rear edge of the flat body of the link, the outwardly projecting push-blade 20 is located. This blade is of substantially semicircular form and extends outwardly and forwardly from the side portions 18 of the body of the link transversely for the full width of the body and at an acute angle which is just slightly less than a right angle. Joined to the inner edge of the blade 20 is the hook-shaped barrel portion 17. This portion 17 has a flat shank 26 which is integrally joined to the associated inner portion of the blade 20 at an obtuse angle slightly greater than a right angle. At each side of this joint, a notch 27 is formed in the inner edge of the blade 20. The rear or outer end of the shank 17 has the hook or barrel 28 itself formed therein being turned outwardly from the plane of the shank in the same general direction as the blade 20. This barrel 28 extends transversely the full width of the shank 17 which is substantially less than the transverse dimension of the main part of the opening 19. In this barrel 28, which has a straight axis, midway of the ends thereof, in the curved rear surface thereof that has its center of curvature at the axis, is an indentation or concavity which provides on the inner surface of the barrel an elongated convex pintle engaging forward bearing surface 30 and which curves transversely of the hook in the direction of the axis of the barrel. It will be noted (FIGURES 2 and 10) that there is a gap 31 between the extremity of the hook and the shank 17 and this gap is greater than the thickness of the material of the link to permit slipping of the pintle portion 16 of the next adjacent link into the cooperating barrel. To prevent separation of adjacent links when they are disposed substantially in the same plane, as in FIGURE 2, a lock finger 17a is struck from the blade 20. This finger is formed by slitting a finger section from the flat part of the barrel portion 17 and then bending the finger section downwardly from the plane thereof at the same side as the barrel 28 and in slightly leading relationship thereto. The trailing barrel 28 is spaced rearwardly from the rearwardmost surface of the leading finger 17a (FIGURE 2) to provide a space or throat 31a through which the pintle portion 16 of the adjacent link can be slipped, this space being the same or slightly less than the thickness of the material in the pintle portion. It will be noted that the finger 17a does not project outwardly from the plane of the shank 17 as much as the hook or barrel 28. To connect one link with the next, the one link is disposed substantially at a right angle to the other, as indicated by broken lines in FIGURE 2, and the pintle 16 of the one link is forced through the space 31a, with its straight edge 21 first, and the pintle is turned and led through the communicating space 31 into the interior of the barrel 28 of the other link. If the two links are now disposed in substantially the same plane, which occurs when the chain is in use as in FIGURE 2, if tension on the chain is relaxed there still will be no separation of the adjacent links because the pintle 16 is limited in its forward movement by the finger 17a and it cannot pass outwardly through the space 31a.

The chain links may be stamped from a strip of metal, such as sheet steel, as indicated diagrammatically in FIGURE 9 where a substantially completely cut and formed blank is indicated at A at the trailing position and a flat cut blank is indicated at B in a leading position. It will be noted that the curved end 20a of the blank B is cut from the preceding blank A in such a manner as to simultaneously produce the curve 22 on the pintle portion 16 of a link. It will also be noted that the hook and barrel forming portion 17b, when cut from the blank B and bent outwardly from the plane thereof, produces the opening 19. The stop finger 17a is formed on the part 17b as indicated by the broken lines. The material wasted from the strip is indicated by the strippling and it will be noted that this amount is inconsequenial. When the portions 27a of the material are removed, they result in narrowing the barrel-forming portion 17b. The ends of the slots thus produced are curved and produce the previously mentioned notches 27. Curving of the ends of the slots in this manner tends to prevent slitting of the material at these ends when the links are operating under load.

Figure 7:
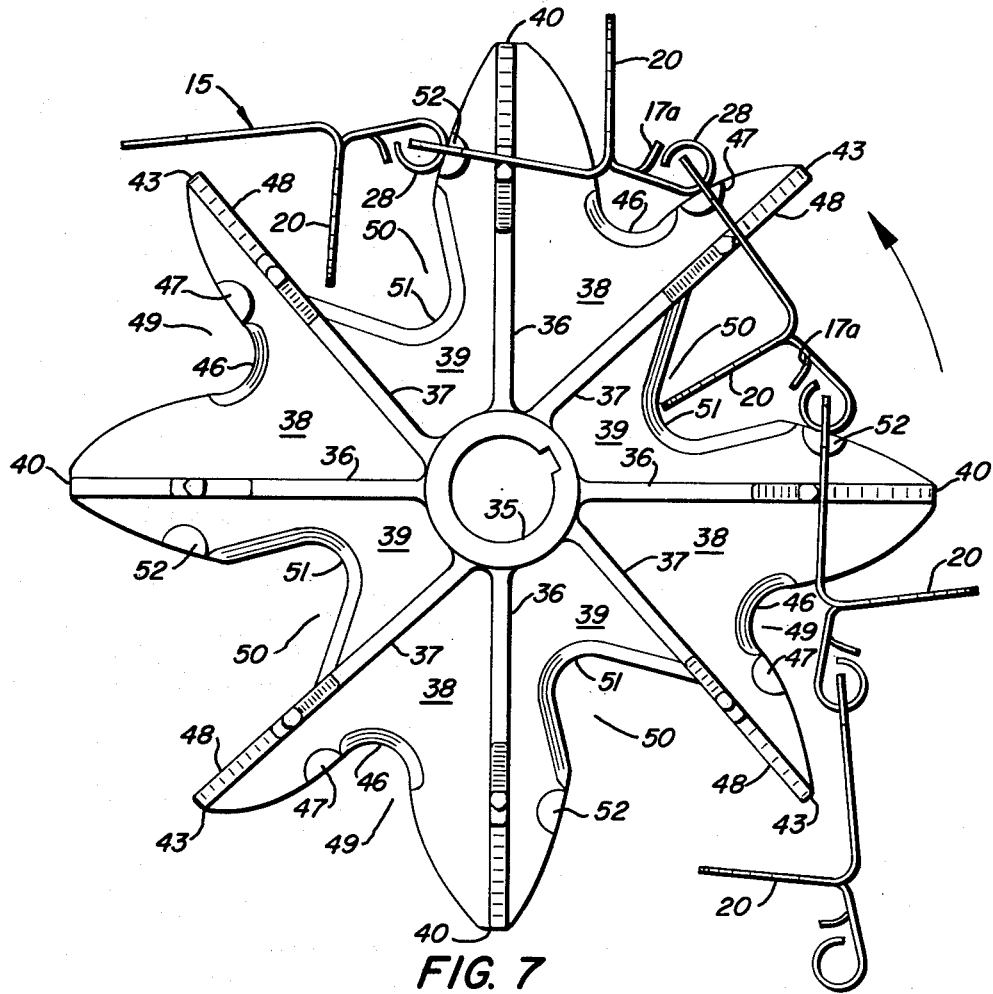
FIGURE 7 is a face elevational view of one of the sprockets with a section of chain cooperating therewith.
Figure 8:
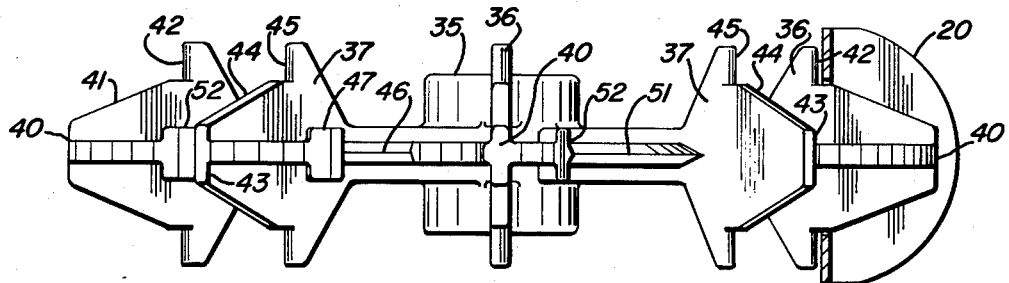
FIGURE 8 is an edge view of one of the sprockets.

Due to the special shape of the chain links and the chain resulting from a plurality of such interlocking links, special sprockets are provided according to my invention for supporting and driving the chain. These sprockets are identical whether they are driving sprockets or idler sprockets and the structure thereof is illustrated best in FIGURES 7 and 8. Each sprocket comprises a hub 35 which has a plurality of angularly spaced spokes 36 extending radially therefrom and a plurality of alternate angularly spaced spokes 37 extending chordally therefrom with the spokes 37 being angularly spaced relative to the respective leading and following spokes 36. Webs 38 extend between each leading spoke 36 and a trailing spoke 37 and webs 39 extend between each trailing spoke 37 and the next spoke 36.

Each of the spokes 36 and 37 has a tooth formed on its outer end in a plane transversely of the spoke. Thus, each spoke 36 has the tooth 40 on its outer end that is transversely or laterally disposed in a flat plane and has the outwardly diverging angular side edges 41 which terminate at laterally extending opposed straight shoulders 42. The tooth 43 on the outer end of the spoke 37 is similarly formed with a flat outer end, the diverging side edges 44 and the straight, oppositely extending shoulders 45.

The web 38 between associated spokes 36 and 37, extends to the outer extremities of both spokes but is provided with an outwardly opening, modified U-shaped recess or notch 49 formed in its outer edge. A knife edge 46 is provided at the inner side of the notch and just outwardly of the knife edge on the portion of the web adjacent the spoke 37 is a chain-engaging bearing pad 47 which projects laterally beyond the web 38 in both directions. Thus, this will provide a substantial heavy chain-engaging bearing surface on what will be the leading surface of the tooth 43 of the spoke 37 when the sprocket is rotated in the proper direction, counterclockwise in FIGURE 7. The web 39 between associated spokes 37 and 36 extends to the outer end of the spoke 36 at one side but terminates short of the outer end of the spoke 37 so that a flat clear surface 48 is provided on what will be the trailing surface of the tooth 43 of the spoke 37. The web 39 is provided with an outwardly opening recess or notch 50 of modified U-form which is provided along its edge with a sharp edge 51. At the outer extermity of this knife edge on the web 39 is a chain-engaging bearing pad 52 of relatively heavy construction which extends laterally in opposite directions beyond both side surfaces of the web. Thus, this will provide a substantial heavy chain-engaging bearing surface on the leading surface of the tooth 40 and these pads 52 and 47 will be at the same distance radially from the center of the hub 35 of the sprocket.

Figure 4:
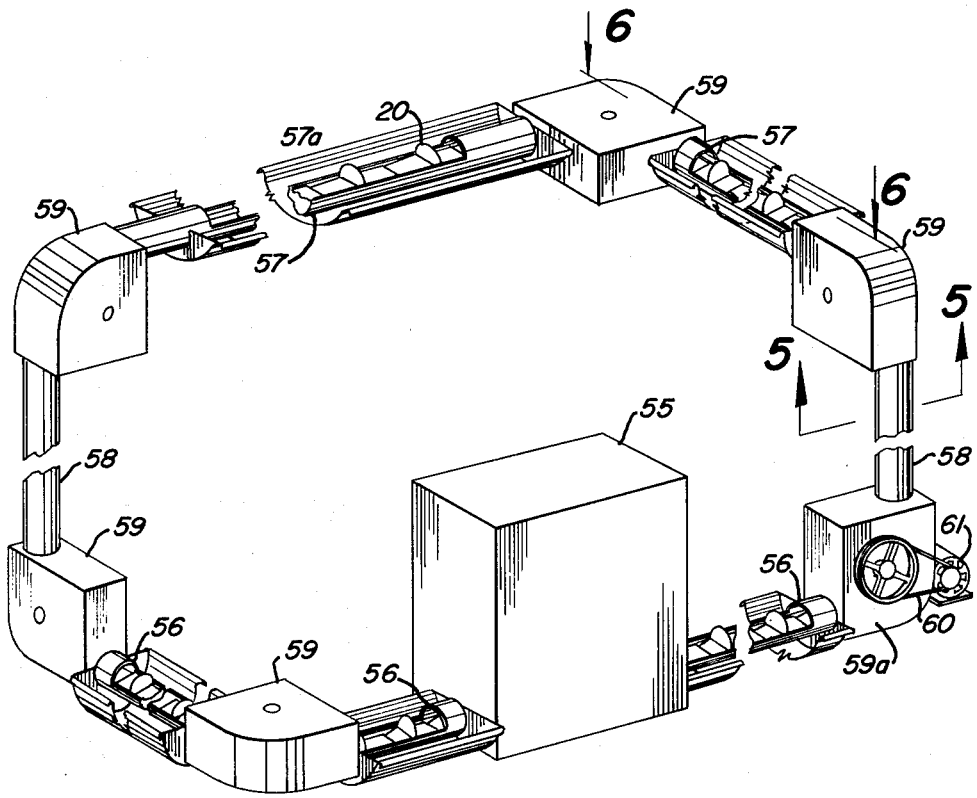
FIGURE 4 is a schematic illustration showing a system in which the chain travels horizontally around corners and between horizontal and vertical runs.

In the preceding description, I have disclosed the structure of the chain links 15, the manner in which they interlock to form a chain of desired length, and the structure of the sprockets which support and drive the chain. In FIGURES 4, 5, and 6, I have illustrated an example of how this chain may be employed. The chain may be directed by various horizontal and vertical positions or even angular positions between horizontal and vertical, horizontal and vertical positions being illustrated in FIGURE 4 but angular positions not being shown. FIGURE 6 shows how the twist in the chain makes it possible to direct the chain in different planes as shown in FIGURE 4. In the example of FIGURE 4, a feed hopper 55 is illustrated as having horizontal open troughs 56 extending therefrom. Other horizontal troughs, such as 57, may be at different levels. At these horizontal troughs, the animals will have access to the feed conducted therealong and at each of these troughs an associated semicircular outer feed trough section may be provided for receiving the feed. The system is also shown as comprising vertical pipe-like or closed conduit sections 58. Corner structures are indicated at 59 and these structures may be disposed in horizontal or vertical planes as necessary. In each corner structure, one of the sprockets will be mounted. Most of these sprockets will be merely idler or supporting sprockets but one of them indicated at 59a may have disposed therein a driving sprocket which is driven by a suitable belt and pulley drive 60, for example, from an electric motor 61.

It will be apparent that with this arrangement the chain will be continuous and will be driven so as to conduct the feed from the hopper 55 through all the various conduit sections, both horizontally and vertically disposed, in a closed circuit back to the hopper. The chain is sufficiently flexible that it can pass around the various corners in a horizontal plane. However, it can also pass from a horizontal to a vertical plane around a corner since it not only can flex considerably in a direction normal to its longitudinal axis or path of movement and can flex laterally to a limited extent but also can twist about its axis. It is this latter characteristic which aids considerably its passage around a corner from one plane to another. The pintle-engaging bearing surfaces 30 facilitate pivoting both laterally in the plane of the chain and relative twisting of adjacent links about the axis of the chain. These surfaces 30 provide pintle-engaging surfaces of limited area which contact the forward or leading edge 21 of the preceding pintle 16 at a substantially point contact. The barrels 28 are large relative to the thickness and area of the material of the pintles 16 so that there is a loose fit. Slippage and friction between interlocking links is held to a minimum. The corners 25 serve to center a barrel on its cooperating pintle 16. The chain links when disposed relatively at right angles can be slipped apart readily because of the gap 31 provided at the barrel or hook and the gap 31a provided between the stop finger 17a and hook 28. However, the gap 31a is of a width to prevent the pintle 16 from passing outwardly therethrough under normal operating conditions of the chain. As indicated in FIGURE 5, when in the closed or annular conduit section 58, the cross-sectional area of the conduit will be substantially filled by the opposed material-engaging blades 20. Because these blades substantially fill the conduit the twisting of the chain about its axis will have no undesirable effect on lifting of the material through the conduit. Furthermore, because the blades 20 are angled forwardly or in the direction of travel of the chain, they will function to pull the material away from the sides or bottom of the closed tube or open trough preventing material-accumulation on on such surface.

The sprockets which support and drive the chain are so designed that they will not interfere with the blades 20 of the chain. In fact, to prevent this, the teeth 40 and 43 of each sprocket are different. The teeth 40 receive those links which have the blades 20 extending outwardly whereas the teeth 43 receive those links which have the blades 20 extending inwardly. The bearing pads 52 on the leading surfaces of the teeth 40 will engage the barrels 28 of the preceding links whereas the bearing pads 47 on the teeth 43 will engage the barrels 28 of the preceding links. The sharp edges 46 of the webs 38 will not accumulate material. This is also true of the sharp edges 51 of the webs 39 and, in addition, the successive blades 20 will sweep over these edges to keep them free of material. The sprocket teeth having the tapered lateral edges 44 will have a lateral centering effect on the links of the chain passing therearound when they are relatively twisted or misaligned. Thus, the chain and sprockets are designed for efficient cooperation.

It will be apparent from the above that I have provided a chain and sprocket structure particularly useful for moving loose-particle material. Many advantages of this structure have been mentioned above and others will be apparent.

Having thus described my invention, what I claim is:

1. A chain composed of interlocking links, each of said links comprising a body having a pintle portion at its leading end and a hook-shaped barrel portion at its trailing end both of which extend transversely of the body, the pintle of one link fitting within the barrel of an adjacent link, said barrel having a convex bearing surface formed intermediate its transverse extent on its inner surface engaging said pintle, each link having a pintle-engaging stop finger spaced in slightly leading relationship to the hook-shaped barrel portion, said body of each link being flat and the pintle being a flat bar-like end having a straight inner trailing edge and a curved outer leading edge, said hook-shaped barrel being arranged out of the plane of the flat body and having the convex bearing surface formed by a boss extending around the curvature of the barrel at its trailing side.

2. A chain according to claim 1 in which the flat body of the chain link has a material-engaging blade extending outwardly from the plane of the flat body.

3. A chain according to claim 2 in which the blade has a curved outer edge and the blade is canted relative to the plane of the flat body.

4. A chain according to claim 3 in which the barrel is formed on a shank extending outwardly from the plane of said body in trailing relationship to said blade.

5. A chain according to claim 4 in which the stop finger is formed on said shank between the blade and the barrel in leading relationship to the barrel.

6. A chain according to claim 5 in which a space of less width than the forward and rearward extent of the pintle is provided between the stop finger and the trailing barrel.

7. A chain according to claim 6 in which a second space is provided between the leading edge of the hook and the shank and communicates with said first space.

8. A chain according to claim 6 in which a stop finger is on said shank between said blade and said barrel.

9. A chain according to claim 6 in which the barrel is of hook form and is formed at the outer end of a supporting shank which is joined to said flat body, said blade being also joined to said flat body at the same position as said shank and being at an obtuse angle relative thereto.

10. A chain according to claim 9 in which said material-engaging blades on successive links extend outwardly in opposite directions from the plane of the chain.

11. A chain composed of interlocking links, each of said links comprising a flat body having a transverse pintle at an end, a transverse barrel on the other end of the body, an outwardly extending, material-engaging blade on said body intermediate said barrel and said pintle and a stop finger on the body between the blade and said barrel.

12. A chain according to claim 11 in which the blade is canted at an angle relative to said body.

13. In combination with a chain composed of interlocking links and each link comprising a body having a sprocket-receiving opening with a blade extending outwardly from the body, said links interlocking by cooperating transversely extending barrel and pintle portions on adjacent links, said blades on successive links extending outwardly in opposite directions; a supporting sprocket for receiving the chain and having teeth for cooperating with the openings in successive links, successive teeth having webs therebetween, alternate webs being provided with outwardly opening recesses sufficient to receive and clear the successive inwardly extending blades on the chain, said link also having a stop between its barrel and its blade.

References Cited by the Examiner
UNITED STATES PATENTS

| 241,796 | 5/81 | Ewart | 198—168 |
| 966,684 | 8/10 | Hamilton | 198—168 X |
| 1,519,931 | 12/24 | Rehbein | 198—168 |
| 1,759,309 | 5/30 | Heimgartner | 198—168 X |
| 2,672,059 | 3/54 | Graetz | 74—248 |
| 2,889,915 | 6/59 | McAuley | 198—176 |
| 3,015,380 | 1/62 | McAuley | 198—176 |

SAMUEL F. COLEMAN, *Primary Examiner.*

EDWARD A. SROKA, *Examiner.*